(12) United States Patent
Tanaka (10) Patent No.: US 7,043,151 B2
(45) Date of Patent: May 9, 2006

(54) PIPE HEATER MANUFACTURING METHOD AND PIPE HEATER

(75) Inventor: Hideki Tanaka, Osaka (JP)

(73) Assignee: ESPEC Corp., Osaka (JP)

( * ) Notice: Subject to any disclaimer, the term of this patent is extended or adjusted under 35 U.S.C. 154(b) by 0 days.

(21) Appl. No.: 11/054,884

(22) Filed: Feb. 10, 2005

(65) Prior Publication Data

US 2005/0184050 A1    Aug. 25, 2005

(30) Foreign Application Priority Data

Feb. 10, 2004    (JP)    ............................. 2004-033262

(51) Int. Cl.
*F24H 1/10*    (2006.01)
(52) U.S. Cl. ...................... 392/480; 392/465; 392/466
(58) Field of Classification Search ...................... None
See application file for complete search history.

(56) References Cited

U.S. PATENT DOCUMENTS 5,027,425 A * 6/1991 Slomka ...................... 392/480
5,557,704 A * 9/1996 Dennis et al. ............... 392/480
6,376,816 B1 * 4/2002 Cooper et al. .............. 219/543

FOREIGN PATENT DOCUMENTS

JP    2002-83672    3/2002
JP    2002-313542    10/2002

* cited by examiner

*Primary Examiner*—Thor S. Campbell
(74) *Attorney, Agent, or Firm*—Jordan and Hamburg LLP (57) ABSTRACT

The pipe heater manufacturing process comprises a vacuum making process A for introducing a stainless steel pipe into a furnace and evacuating the inside of the furnace, for example, to a pressure of 0.5 Torr, a pipe end sealing process B for brazing and sealing plugs 3 to both ends of the pipe under vacuum and brazing, a process C for forming a lower insulating layer by repeating several times the steps of screen printing an insulating glass material and baking it in a state in which the two ends of the pipe are sealed, and similar formation process D of a heat generating layer and formation process E of an upper insulating layer. With this method, baking in an oxygen-free state inside the pipe makes it possible to obtain the oxidation-free clean state without high-temperature corrosion on the inside of the pipe having the fluid to be heated flowing therein and to manufacture a pipe heater in which a heating response was improved by forming thin heating layer and insulating layer.

5 Claims, 6 Drawing Sheets

PIPE HEATER MANUFACTURING METHOD AND PIPE HEATER

BACKGROUND OF THE INVENTION

The present invention relates to a pipe heater manufacturing method for the manufacture of a pipe heater equipped with an electric resistor on the outer side of a stainless steel pipe and so formed that the fluid which is to be heated flows inside the pipe and also to a pipe heater produced by this manufacture method.

A rubber heater manufactured by a manufacturing method comprising the steps for coating the outer surface of a tubular member composed of a fluororesin tube with a silicone crude rubber sheet, winding a heat generating wire on top of the coating, coating a second silicon crude rubber sheet on top of it, winding an insulating material by tightly applying on top of the coating, heating at a temperature of 140–160° C. and curing the silicone crude rubber sheet in a semimolten state thereof, and producing an elastomer having the heat-generating wire embedded therein is known and described in, for example Laid-open Japanese Patent Application No. 2002-313542 (JP '542), and in particular FIG. 1 and the related explanation of the reference specification, where the reference teaches a pipe heater so formed that a fluid which is to be heated flows inside a pipe composed of any materials selected from a group of materials including stainless steel.

A pipe heater is also known which is manufactured by a manufacturing method comprising the steps for coating the outer surface of a pipe material with an insulating glass by any appropriate method, for example, a screen printing method, then baking to form an insulating glass layer, printing on top thereof a paste such as a silver-palladium paste by any appropriate method, for example, a screen printing method, then baking to form a resistor layer, and similarly forming a protective glass layer, such as described in Laid-open Japanese Patent Application No. 2002–83672 (JP '672), and in particular FIGS. 1, 2, 6 and the related explanation of the reference specification, where the reference teaches a pipe heater that is so formed that a fluid which is to be heated flows inside or outside a pipe composed of any material selected from a group of materials including stainless steel.

Those of the pipe heaters that are used, for example, for the below-described hydrogen supply apparatus and oxygen supply apparatus for a fuel cell evaluation device or for apparatuses for the fabrication of semiconductors or chemical machines and apparatuses are required to provide a high-level heating response and a high degree of cleanliness to prevent the penetration of foreign matter into the fluid which is to be heated.

With the rubber heater of JP' 542, the tubular member where the fluid flows is not heated to a high temperature in the manufacturing process. Therefore, if a stainless steel is used for the tubular member, it is maintained in a sufficiently clean state, without oxidation on the inner surface thereof. However, in rubber heaters, the elastomer composed of a silicone crude rubber sheet having a heat generating wire embedded therein has a low thermal conductivity and a large thickness. As a result, it has a high resistance to heat transfer and a large heat retention quantity and a long time is required to heat the rubber heater itself. The resultant problem is that a high-level heating response cannot be obtained.

In the pipe heater of JP '672, the insulating glass layer is formed by screen printing, the thickness thereof is sufficiently small and a high-level heating response can be obtained due to good thermal conductivity of glass. However, because the insulating glass layer is baked at a high temperature, even when a stainless steel is used for the tubular section, oxides are formed on the inner surface thereof due to high-temperature corrosion and there is a risk of those oxides penetrating into the fluid flowing inside the pipe. The resultant problem is that high-degree cleanliness of the inner surface of the pipe cannot be obtained.

BRIEF SUMMARY OF THE INVENTION

Accordingly, it is an object of the present invention to resolve the above-described problems inherent to the conventional technology and to provide a method for the manufacture of a pipe heater and a pipe heater making it possible to obtain a high-level heating response and high-degree cleanliness at the same time.

In order to resolve the above-described problems, the invention provides a pipe heater manufacturing method for the manufacture of a pipe heater equipped with an electric resistor on the outer side of a stainless steel pipe and so formed that the fluid which is to be heated flows inside the pipe, the method comprising a vacuum making process for introducing the pipe into a furnace and evacuating the inside of the furnace, a pipe end sealing process for sealing both end portions of the pipe to interrupt the flow through the pipe in the vacuum, a formation process of a lower insulating layer for attaching an insulating glass material to the outer side of the pipe having both the end portions thereof sealed and then baking to form a lower insulating layer, a formation process of a heat generating layer for attaching the electric resistor on top of the lower insulating layer and then baking to form a heat generating layer, a formation process of an upper insulating layer for attaching an insulating glass material on top of the heat generating layer and then baking to form an upper insulating layer, and a pipe end cut off process for cutting off both end portions.

Because the pipe is introduced into a furnace and the inside of the furnace is evacuated by the vacuum making process, the air present inside the pipe is removed by the evacuation and the concentration of oxygen inside the pipe can be sufficiently reduced. Because both end portions of the pipe are sealed to interrupt the flow through the pipe under vacuum in a pipe end sealing process, the inside of the pipe can be maintained in a state with a sufficiently low concentration of oxygen.

Because a lower insulating layer is formed by attaching an insulating glass material to the outer side of the pipe having both end portions thereof sealed and then baking in the formation process of a lower insulating layer, the inner surface of the pipe can be held in a substantially non-oxidizing state even when the stainless steel pipe is exposed to a high temperature when the insulating glass material attached by screen printing or the like is baked at a temperature of about 850° C.

Thus, in the baking process, the operations of printing and baking are usually repeated multiple times and the normal-temperature state and high-temperature state of the pipe are repeatedly assumed multiple times. However, because the inside of the pipe is evacuated, the pressure inside the pipe does not rise at a high temperature. As a result, the sealed state between the zones inside and outside the pipe can be reliably maintained. As a result, the air is not supplied to the inside of the pipe, oxygen present in the air does not penetrate into the pipe, and the inside of the pipe can be maintained in an almost oxygen-free state. Therefore, oxidation of the inner surface of the pipe is reliably prevented and the clean state inside the pipe is reliably maintained. On the other hand, because the thickness of the glass insulating layer is usually as small as about 0.1 mm and the glass insulating layer has good thermal conductivity, heat resistance is low and heat can very rapidly penetrate through the insulating layer.

The heat generating layer is formed by attaching the electric resistor on top of the lower insulating layer and then baking in a formation process of a heat generating layer. Therefore, heat generated in this layer can be transferred into the pipe via underlying insulating layer and the pipe can heat the fluid that flows therein. In this case, because the insulating layer has a low thermal resistance, the generated heat can be transferred to the fluid at a very high rate via the stainless steel pipe. Thus, the heating response can be improved. Furthermore, in this process, the pipe is exposed to a temperature of about 850° C., but the oxidation of the inner surface of the pipe can be prevented in the same manner as in the formation process of the lower insulating layer.

The pipe heater provided with insulating properties is formed by a formation process of an upper insulating layer. In this process, too, the operation effect similar to that of the formation process of a lower insulating layer is obtained. Furthermore, because both end portions of the sealed pipe are cut off in a pipe end cut off process after the processes accompanying the above-described baking have been completed, a pipe heater open at both ends and capable of passing the fluid being heated therethrough can be manufactured without oxidizing the inside of the pipe.

In the pipe heater manufactured in the above-described manner, a glass insulating layer with a thickness of about 0.2 mm was mainly formed on the surface of the stainless steel pipe. Therefore, heat capacity in this portion is small. As a result, the temperature rises immediately during heating. Accordingly, from this standpoint, too, the heating response is good.

As described hereinabove, the invention can provide a pipe heater with a fast heating response and a clean surface along which the fluid being heated is passed. Further, in the manufacture of such a clean pipe heater, subsequent processes involve only a sealing process of the pipe in vacuum and a sealed portion cut off process. Therefore, this method for manufacturing a pipe heater is simple and inexpensive.

According to a further aspect of the invention, in addition to the above, the vacuum making process has an inert gas supplying process for creating an inert gas atmosphere in the furnace and introducing the inert gas into the pipe.

Accordingly, the vacuum making process has an inert gas supplying process for creating an inert gas atmosphere in the furnace and introducing the inert gas into the pipe. Therefore, for example, when the inside of the furnace is evacuated to an absolute pressure of 0.5 Torr, a very small quantity of air still being present inside the furnace can be replaced with an inert gas, for example, argon, and a state with even lower oxygen concentration can be obtained inside the pipe. Furthermore, because the inert gas atmosphere is obtained under vacuum, even though the inert gas expands when the pipe during baking is heated to a temperature of about 850° C., because the pressure thereof is at a sufficiently low level, leakage of the inert gas to the outside of the pipe and the penetration of air into the pipe at a low temperature following this process can be prevented. As a result, a clean pipe heater which is absolutely free of oxidation-induced corrosion can be manufactured at a low cost by an inexpensive vacuum making process capable of making vacuum of about 0.5 Torr.

According to a further aspect of the invention, the pipe end sealing process is a brazing process for brazing the sealing members equipped with shaft portions that are introduced into the pipe to both end portions of the pipe.

Accordingly, the pipe end sealing process is a brazing process for brazing the sealing members equipped with shaft portions that are introduced into the pipe to both end portions of the pipe. Therefore, the sealing members and the inner surface of the pipe can be tightly joined, the passage through the pipe can be more reliably interrupted, and even if the pressure inside the pipe rises when the degree of vacuum formed in the vacuum making process is low, the sealed state at both ends of the pipe can be reliably maintained. Further, because it is not necessary to conduct machining such as threading, as in the case where the lids are screwed to the end portions of the pipe, the pipe thickness can be minimized and the heating response can be further improved.

In accordance with a further aspect of the invention, in addition to the above, the brazing process is a temperature rise brazing process for providing recesses in the circumferential direction in the shaft portions, introducing a braze into the recess, raising the temperature inside the furnace after the shaft portions have been inserted into both end portions of the pipe, melting the braze, and joining the inner sides of both end portions of the pipe and the shaft portions.

Accordingly, the brazing process is a temperature rise brazing process comprising the steps for providing recesses in the circumferential direction in the shaft portions, introducing a braze into the recesses, raising the temperature inside the furnace after the shaft portions have been inserted into both end portions of the pipe, melting the braze, and joining the inner sides of both end portions of the pipe and the shaft portions. Therefore, brazing can be conducted by a simple operation of increasing the temperature inside the furnace, without employing usual brazing operations. Furthermore, because the entire pipe is uniformly heated, bending or local deformation of the pipe is prevented. As a result, when screen printing on the pipe is conducted, for example, in the formation process of insulating layer, a good printing state can be obtained. Furthermore, quality of the pipe heater can be improved.

In accordance with a further aspect of the invention, a pipe heater manufacturing method is provided for the manufacture of a pipe heater equipped with an electric resistor on the outer side of a stainless steel pipe and so formed that the fluid which is to be heated flows inside the pipe, the method comprising a pipe end sealing process for sealing both end portions of the pipe to interrupt the flow through the pipe, a formation process of a lower insulating layer for attaching an insulating glass material to the outer side of the pipe having both the end portions thereof sealed and then baking to form a lower insulating layer, a formation process of a heat generating layer for attaching the electric resistor on top of the lower insulating layer and then baking to form a heat generating layer, a formation process of an upper insulating layer for attaching an insulating glass material on top of the heat generating layer and then baking to form an upper insulating layer, and a pipe end cut off process of cutting off both end portions, wherein in the pipe end sealing process, both end portions of the pipe are sealed so that the gas sealed inside the pipe is prevented from leaking to the outside when the gas temperature rises, the gas is expanded, and the pressure thereof rises when the baking is conducted.

Accordingly, the pipe end sealing process is implemented under atmospheric pressure and the inside of the pipe is sealed in a state in which the usual air is introduced into the pipe as the gas under the atmospheric pressure. However, in the pipe end sealing process, both end portions of the pipe are sealed so that the air sealed inside the pipe does not leak to the outside when the temperature thereof rises, it expands, and the pressure thereof rises during baking. Therefore, even though the air that has been initially introduced into the pipe undergoes repeated cycles of expansion and shrinkage due to repeated changes in temperature from the normal temperature to high temperature and pressure inside the pipe fluctuates, no new air penetrates into the pipe.

As a result, despite a possibility of oxidation of the inner surface of the stainless steel pipe by the oxygen present in the air that was initially sealed inside the pipe, because the quantity of oxygen in this case is extremely small, the degree of oxidation is sufficiently low. Therefore, the pipe heater manufactured in the above-described manner can be used, as a pipe heater with a sufficient level of cleanliness inside the pipe, in the usual fields requiring clean pipe heaters, which are different from the applications with extremely stringent requirements relating to a non-oxidized state.

In yet further accordance with the invention, there is provided a pipe heater equipped with an electric resistor on the outer side of a stainless steel pipe and so used that the fluid which is to be heated flows inside the pipe, the pipe heater being produced by a pipe heater manufacturing method comprising a vacuum making process for introducing the pipe into a furnace and evacuating the inside of the furnace, a pipe end sealing process for sealing both end portions of the pipe to interrupt the flow through the pipe in the vacuum, a formation process of a lower insulating layer for attaching an insulating glass material to the outer side of the pipe having both end portions thereof sealed and then baking to form a lower insulating layer, a formation process of a heat generating layer for attaching the electric resistor on top of the lower insulating layer and then baking to form a heat generating layer, a formation process of an upper insulating layer for attaching an insulating glass material on top of the heat generating layer and then baking to form an upper insulating layer, and a pipe end cut off process for cutting off both end portions.

According to a further aspect of the invention, there is provided a pipe heater equipped with an electric resistor on the outer side of a stainless steel pipe and so used that the fluid which is to be heated flows inside the pipe, the pipe heater being produced by a pipe heater manufacturing method comprising a pipe end sealing process for sealing both end portions of the pipe to interrupt the flow through the pipe, a formation process of a lower insulating layer for attaching an insulating glass material to the outer side of the pipe having both end portions thereof sealed and then baking to form a lower insulating layer, a formation process of a heat generating layer for attaching the electric resistor on top of the lower insulating layer and then baking to form a heat generating layer, a formation process of an upper insulating layer for attaching an insulating glass material on top of the heat generating layer and then baking to form an upper insulating layer, and a pipe end cut off process of cutting off both end portions, wherein in the pipe end sealing process, both end portions of the pipe are sealed so that the gas sealed inside the pipe is prevented from leaking to the outside when the gas temperature rises, the gas is expanded, and the pressure thereof rises when the baking is conducted.

BRIEF DESCRIPTION OF THE DRAWINGS

Accompanying the specification are figures which assist in illustrating the embodiments of the invention, in which.

DETAILED DESCRIPTION OF THE INVENTION

The following elements are disclosed herein:
1 PIPE
2 ELECTRIC RESISTOR
3 PLUG (SEALING MEMBER)
13 LOWER INSULATING LAYER
14 HEAT GENERATING LAYER
15 UPPER INSULATING LAYER
31 SHAFT PORTION
31a CIRCULAR GROOVE (RECESS)
100 FURNACE
A VACUUM MAKING PROCESS
B PIPE END SEALING PROCESS
B1 BRAZING PROCESS (PIPE END SEALING PROCESS)
B2 TEMPERATURE RISE BRAZING PROCESS (BRAZING PROCESS, PIPE END SEALING PROCESS)
C FORMATION PROCESS OF A LOWER INSULATING LAYER
D FORMATION PROCESS OF A HEAT GENERATING LAYER
E FORMATION PROCESS OF AN UPPER INSULATING LAYER
F PIPE END CUT OFF PROCESS
W BRAZE FIGS. 1 to 4 illustrate an example of the pipe heater manufacturing method employing the present invention, the configuration of the manufactured pipe heater, and the implementation mode of the pipe end sealing process.

Figure 1:
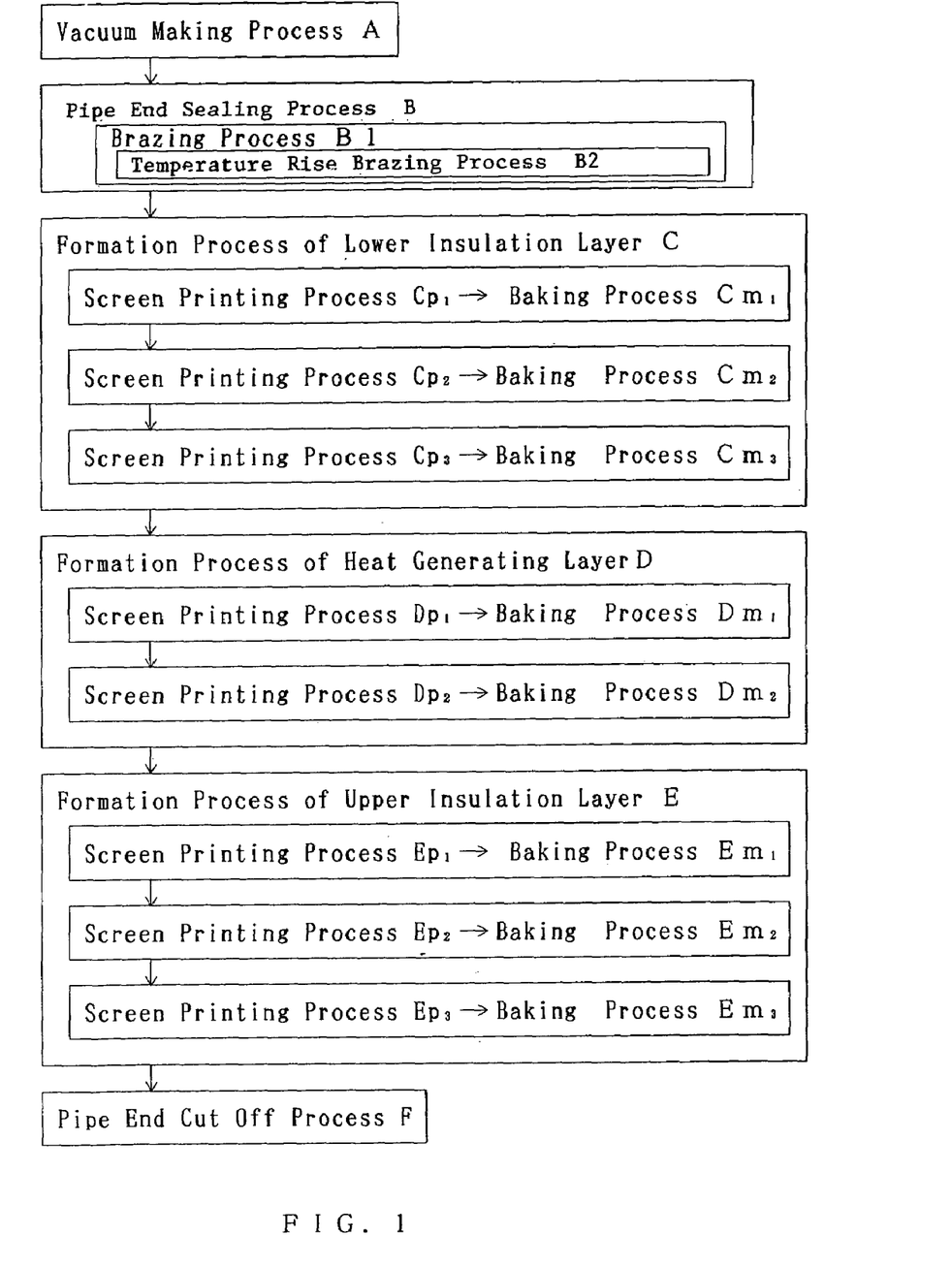
FIG. 1 is an explanatory drawings illustrating an example of the pipe heater manufacturing method employing the present invention.
Figure 2A:
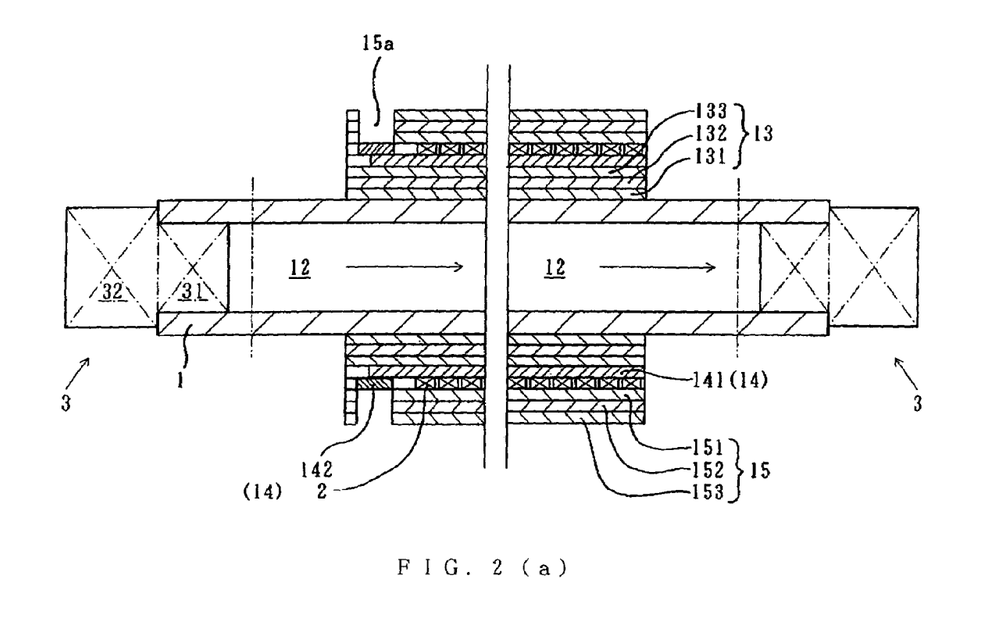
FIG. 2(a) is a cross-sectional view illustrating schematically a configuration example of the pipe heater manufactured by the aforementioned method, (b) is an explanatory drawing of a printing state.
Figure 2B:
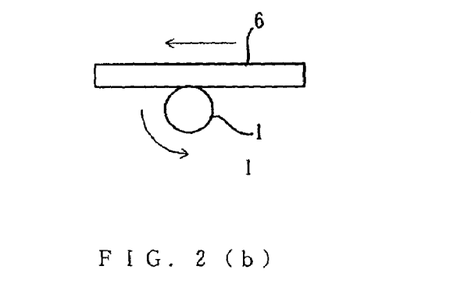

The pipe heater manufacturing method, as shown in FIG. 2, is a method for the manufacture of a pipe heater in which an electric resistor 2 is provided on the outer side of a stainless steel pipe 1 and which is so formed that hydrogen or clean air, for example, in the application for a fuel cell evaluation device, flows as shown by an arrow as a fluid being heated inside the pipe. As shown in FIG. 1, this manufacturing method comprises a vacuum making process A, a pipe end sealing process B, a formation process C of lower insulating layer, a formation process D of heat generating layer, a formation process E of upper insulating layer, and a pipe end cut off process F. FIG. 2 is an enlarged view schematically showing the pipe thickness and the thickness of each layer formed thereon.

Figure 3A:
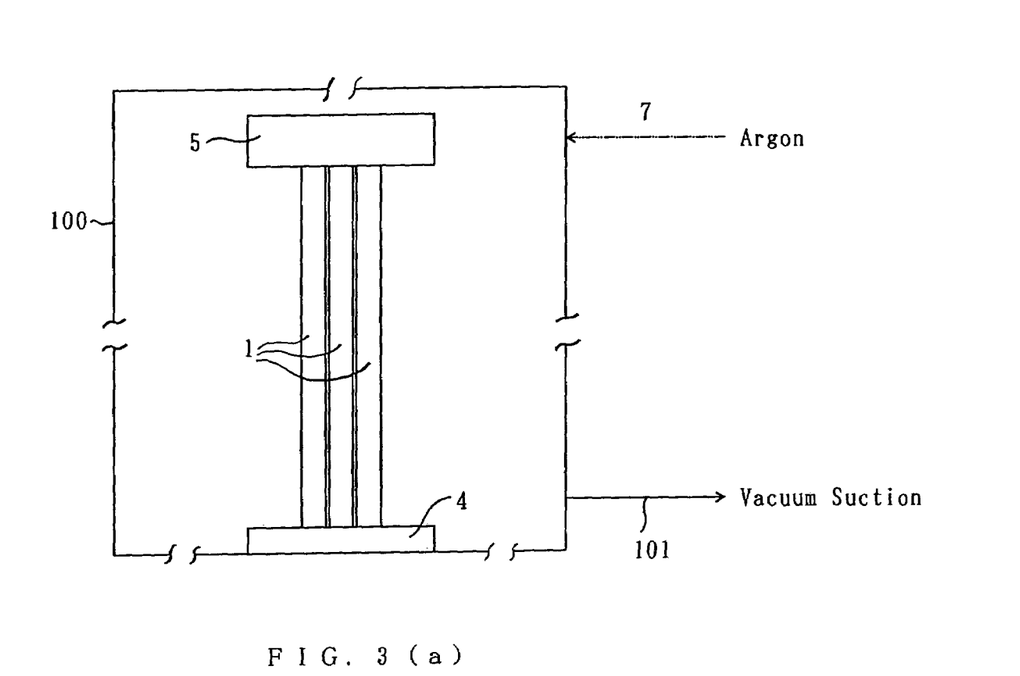
FIG. 3(a) is an explanatory drawing illustrating the state in which the pipe of the pipe heater is introduced into a furnace, (b) is a transverse sectional view of the pipe portion of (a)
Figure 3B:
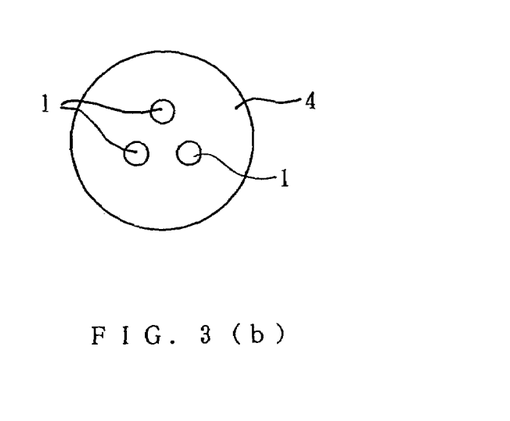

In the vacuum making process A, as shown in FIG. 3, a pipe 1 is introduced into a furnace 100 and the inside thereof is evacuated. Dimensions and material of the pipe 1 are determined according to the application of the pipe heater which is being manufactured. In applications for fuel cell evaluation devices, stainless steels SUS316, 316L, 444 (JIS numbers), which have high corrosion resistance, are used as the stainless steel material for the pipe 1. The dimensions are about as follows: inner diameter 10 mm, thickness 1 mm, and length 150 mm.

A usual vacuum furnace is used as the furnace 100. The inside of the furnace is evacuated with a vacuum suction pipe 101 connected to a vacuum pump (not shown in the figure). In the present example, the degree of vacuum inside the furnace, as represented by absolute pressure, is 0.5 Torr. However, a high-vacuum furnace with a degree of vacuum of $5 \times 10^{-5}$ Torr, which is close to the absolute vacuum, may be also used.

Figure 4:
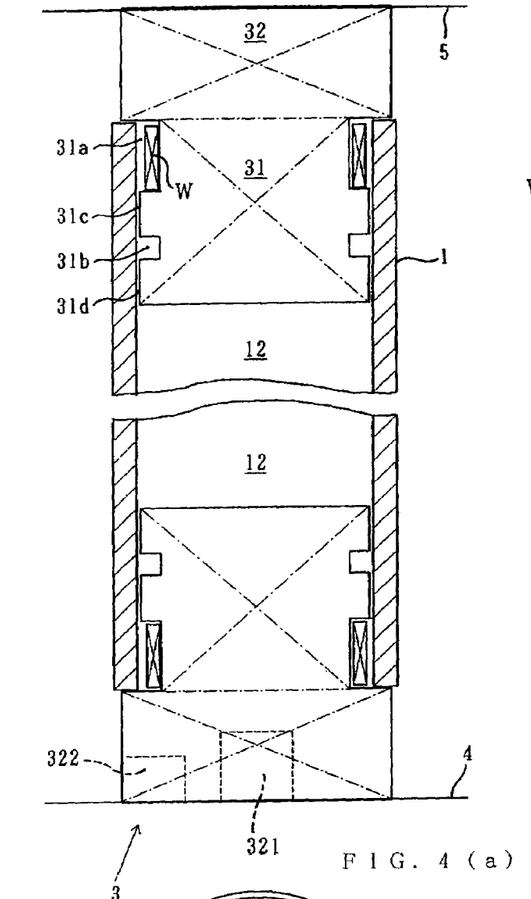
FIG. 4 shows a pipe and plug portion during brazing inside the furnace, (a) is a cross-sectional view, (b) is a bottom view, and (c) and (d) are cross-sectional views of the plug portion.

In the present example, a temperature rise brazing process B2 selected among the brazing processes B1 is used as the pipe end sealing process B. In the temperature rise brazing process B2, both end portions of the pipe are sealed so as to interrupt the flow through the pipe 1 in a vacuum of 0.5 Torr. This sealing is conducted by brazing to both end potions of the pipe 1 the plugs 3 which are the sealing members equipped with shaft portions 31 to be inserted into the pipe 1 as shown in FIG. 2 and FIG. 4.

Further, the brazing is conducted by temperature rise brazing in which circumferential grooves 31a, which are recesses, are provided in the circumferential direction in the shaft portions 31, a braze W is placed into the grooves 31a, the shaft portions 31 are inserted into the two end portions of the pipe 1, the temperature inside the furnace 100 is raised to 1200° C., which is the melting point of the braze, the braze is melted, and the inner sides of both end portions of the pipe are joined to the shaft portions. In this case, in the present example, second circumferential grooves 31b are provided in addition to circumferential grooves 31a. Gap portions 31c and 31d are formed between the shaft portions 31 and inner surface of the pipe. Usually a stainless steel such as SUS304 is used as the material for the plug 3. A foil-like braze is introduced into the circumferential grooves 31a by multi-turn winding.

As described hereinabove, the brazing process itself is conducted under vacuum, but the plugs 3 with the braze W introduced therein are inserted in advance into both ends of the pipe 1 outside the furnace. Then, the pipe 1 having the plugs 3 introduced into both end portions thereof is placed into the furnace 100. Therefore, the pipe 1 plugged at both ends has thus been introduced into the furnace from the start of the vacuum making process A. In the present example, such pipes 1 are arranged vertically as a set of three pipes in a support plate 4, as shown in FIG. 3. A weight plate 5 is placed on the top portions of the pipes. The pipes 1 are disposed inside the furnace 1 in this state. Further, FIG. 3 shows a small furnace 100, but actually the furnace is large and ten or more sets each containing 3 such pipes can be introduced into the furnace. The pipes 1 are supported with appropriate members (not shown in the figure) preventing the pipes from falling over from the support plate 4.

As described hereinabove, if the inside of the furnace 100 is evacuated to a pressure of 0.5 Torr in the vacuum making process A, then the air present in the pipe inner space 12 of the pipe 1 between the upper and lower plugs 3 is released into the inside of the furnace between the inner surface and end surface of the pipe ends through the gap portions 31d formed prior to brazing, second circumferential grooves 31b, gap portions 31c, circumferential grooves 31a, and gaps formed in the contact portions of the plugs 3 with the end surface of the pipe 1 and the edge portions of the lids 32, and the portion of the pipe inner space 12 is also evacuated to a pressure of 0.5 Torr. As a result, practically entire air under the atmospheric pressure that was initially introduced into the pipe inner space 12 is released therefrom and only about 0.07% thereof remains in the pipe. Therefore, an extremely small amount of oxygen remains in the pipe inner space 12.

The temperature rise brazing process A2 is conducted in this state. Thus, a heating apparatus (not shown in the figure) is actuated and the temperature inside the furnace is raised, as described above, to about 1200° C. As a result, the braze W is melted, the pipe 1 and plugs 3 are joined at the circumferential gap 31a, gap portion 31c, and between the end surface of the pipe 1 and lid 32, and a sealed structure is obtained. In this case, on the upper end side of the pipe, the gap portions 31c formed in the pipe end portion in the form of a labyrinth, second circumferential groove 31b, and gap portion 31d prevent the molten braze W from flowing down into the pipe inner space 12 located therebelow. Further, in the present example, the upper and lower plugs 3 had the same structure, but the second circumferential groove 31b and gap portion 31d may be omitted on the lower side.

If the braze W melts, the fitting balance of the plugs 3 and inner surface of the pipe can change and the plugs 3 can be tilted. However, because the posture of the plugs 3 is maintained by the weight plate 5, the occurrence of such an unbalance is reliably prevented. If the temperature inside the furnace is decreased and the braze is solidified after it has melted, the vacuum inside the furnace is released, the temperature rise brazing process A2 is ended, and the pipe 1 with both ends thereof sealed is removed. This pipe 1 is strongly joined to the plugs 3 by the braze W. Further, the pipe inner space 12 is reliably sealed. The air containing oxygen is sealed inside the pipe inner space, but the amount thereof is extremely small.

This temperature rise brazing process A2 comprises only the steps of increasing and decreasing the temperature inside the vacuum furnace. Therefore, the usual brazing operation becomes unnecessary, and the operations and control thereof are greatly simplified. Further, the spread in quality of brazed parts is prevented and a good brazed state can be obtained with high reliability. Moreover, because multiple pipes can be treated at the same time, the efficiency can be raised and productivity can be increased.

It is also possible to implement as the brazing process a process comprising the steps for forming the recess 32a in part of the lid 32 of the plug 3, as shown in FIGS. 4(c) and (d), introducing a powdered braze W into the recess, melting the braze, solidifying the braze, cutting out the outer peripheral portion of the lid 32, producing the plug 3 having the braze W fixedly attached thereto in advance, inserting this plug 3 into the pipe 1, disposing the pipe in the vacuum furnace 100, as shown in FIG. 3, and then conducting the above-described vacuum making process A and temperature rise brazing process B2.

In the formation process C of a lower insulating layer, an insulating glass material is attached to the outer side of the pipe 1 having both said end portions thereof sealed and then baking is conducted to form a lower insulating layer 13. In the present example, the insulating layer 13 is composed of three layers 131 to 133, each layer being formed by repeating the screen printing processes $Cp_1$ to $Cp_3$ and baking processes $Cm_1$ to $Cm_3$ of the insulating glass material attached by the screen printing processes for each one layer. With those processes, the necessary and sufficient thickness of the insulating layer 13 of about 0.1 mm can be formed with good accuracy to ensure the insulating performance.

In the screen printing process Cp, as shown in FIG. 2(*b*), a carrier 6 having an insulating glass material coated thereon is fed with a printing machine (not shown in the figure) in the direction shown by an arrow and the pipe 1 is rotated synchronously with this feed. In this case, the plugs 3 are brazed in the temperature rise brazing process B2 to the pipe 1, an opening 321 for centering and an opening 322 for rotation are formed, as shown in FIG. 4, in the lid 32, the centering pin and rotation pin of the printing machine head are fit into the respective openings, a torque is applied, while maintaining the rotation center, and the pipe 1 is rotated. Therefore, the plug 3 is used as both the pipe end sealing member and a printing jig and the utilization value thereof is increased. Furthermore, in the case of printing conducted without providing the plug 3 for sealing the pipe, the pipe is centered by using a tubular jig, such as the plug 3, and notches are provided in both end surfaces of the pipe to form engagement sections for rotation. Therefore, even if a plug with the openings machined in the lid thereof is provided for the employment of the present invention, it does not result in the increased number of components or additional machining operations.

The baking process Cm is conducted in the usual furnace, which is not a vacuum furnace. The baking temperature is 850° C. Because the baking temperature is sufficiently lower than 1200° C., which is the melting point of the braze, the braze joining the pipe and the plugs is not melted. Therefore, a good state of the pipe equipped with the lids is maintained despite repeated baking. Further, if the temperature of pipe 1 rises during baking, the gas present inside the pipe inner space 12 expands and the pressure thereof rises. However, because the original pressure is about 0.5 Torr, a high-vacuum state is obviously assumed inside the pipe inner space 12, and this level of air tightness is reliably maintained by brazing. As a result, absolutely no air penetrates from the outside. Therefore, continuous oxidation of the surface of the pipe inner space 12 and the occurrence of high-temperature corrosion caused by the penetration of external air are completely prevented.

On the other hand, as described hereinabove, the air in an amount of about 0.07% that at the atmospheric pressure is sealed in the pipe inner space 12 under a pressure of 0.5 Torr. If the inner diameter of the pipe 1 is 10 mm and the length thereof is 150 mm, the quantity of oxygen present in this area is about 0.002 mg. Therefore, even if we assume that the entire quantity of this oxygen is consumed for oxidation, then the oxidation-induced corrosion caused thereby will be at a practically negligible level. Therefore, this manufacturing process can produce a clean pipe heater suitable for practically any application.

In the formation process D of a heat generating layer, an electric resistor 2 composed of silver and palladium is attached on top of the insulating layer 13 and then baked to form a heat generating layer 14. In the present example, this process, too, is conducted by screen printing. For this purpose the screen printing processes Dp1 and Dp2 and baking processes Dm1 and Dm2, each comprising the steps for consecutively printing a silver wiring 141 using silver as a wiring material connected to the electric resistor 2 and terminal portions 142 of the electric resistor 2 and the silver wiring, are repeatedly implemented for each printing. Here, too, the process of baking at a temperature of 850° C. is conducted twice, but because the inside of the pipe is sealed and no oxygen is supplied from the outside, absolutely no high-temperature corrosion caused by oxidation occurs in the pipe inner space 12.

In the formation process E of an upper insulating layer, an insulating glass material is attached on top of the heat generating layer 14 and baked to form an upper insulating layer 15. The insulating layer 15 is composed of three layers 151 to 153, similarly to the lower insluting layer 13, and is formed by similarly repeating the screen printing processes Ep1 to Ep3 and baking processes Em1 to Em3 of the insulating glass material for each one layer. The zone above the terminal portion 142 of the heat generating layer 14 serves as an open window 15a where the insulating layer 15 was not formed so as to allow for the connection of an electric wire from the outside. The printing method, baking method, and thickness of the insulating layer are identical to those explained with reference to the insulating layer 13. Further, in the process E, the operation effect similar to that of the process C is produced.

In the pipe end cutting process F, both end portions of the pipe 1 are cut off by an appropriate method by using a pipe cutter or the like. The cutting position, as shown by a dash-dot line in FIG. 2, is selected with a small margin from the end of the shaft portion 31 of the plug 3. As a result, a pipe heater can be manufactured through which a fluid to be heated, such as hydrogen or air, is passed while being heated. This pipe heater is a thin-layer pipe heater in which the surface of the pipe 1 usually having a thickness as small as about 1 mm is coated over the entire surface with an insulating glass material mainly with a thickness of about 0.2 mm. Therefore, heat capacity of the pipe heater itself is sufficiently small. Therefore, if heating is conducted, the temperature of the entire pipe heater rises rapidly and the fluid can be heated. From this standpoint, too, the heating response is good.

With the above-described pipe heater manufacturing process, a total of 8 baking processes can be all implemented in the usual furnace by using a vacuum furnace only once. Therefore, the process for the manufacture of a clean pipe heater is greatly simplified.

Figure 5:
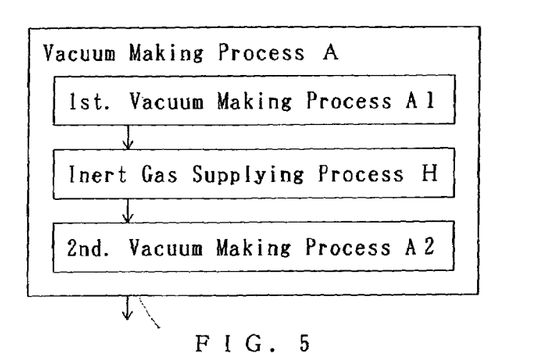
FIG. 5 is an explanatory drawing illustrating part according to another example of the pipe heater manufacturing method employing the present invention.

FIG. 5 illustrates another example of the pipe heater manufacturing process in accordance with the present invention.

In this example, the vacuum making process A has an inert gas supplying process H for creating an inert gas atmosphere inside the furnace 100 and introducing the inert gas into the pipe 1. An inert gas supply system 7 shown by a two-dot chain line in FIG. 3 is provided to implement this process. For example, argon is used as the inert gas. In the inert gas supply system 7, argon is supplied into the furnace 100 under the atmospheric pressure. For this purpose, the vacuum making process A is composed of a first vacuum making process A1 for obtaining an initial pressure of 0.5 Torr inside the furnace, an inert gas supplying process H for supplying argon, and creating inside the furnace a pressure of 760 Torr, which is equivalent to the atmospheric pressure, with the argon and a very small amount of air remaining at a pressure of 0.5 Torr, and a second vacuum making process A2 for obtaining again a pressure of 0.5 Torr inside the furnace.

With the method of this example, in the first vacuum making process A1, a pressure of 0.5 Torr is obtained inside the furnace, the same pressure is obtained inside the pipe 1, and a very small amount of air of 0.07% that at the atmospheric pressure is left inside the furnace. In this state, in the inert gas supplying process H, argon is supplied into the furnace 100, and the inside of the furnace and the inside of the pipe 1 are filled with a mixed gas at a pressure of 760 Torr composed of the aforementioned very small amount of air and 99.93% argon. In the second vacuum making process, the inside of the furnace and the inside of the pipe are again evacuated to a pressure of 0.5 Torr, the quantity of the mixed gas inside the pipe is reduced to 0.07% that at the atmospheric pressure, the inside of the pipe is thereby filled with a mixed gas composed of air at about 0.005% and argon at about 0.065% those at the atmospheric pressure, the quantity of oxygen remaining inside the pipe is further reduced with respect to that obtained by the method illustrated by FIG. 1, and the level of oxygen quantity can be substantially considered as a zero level. The pipe end sealing process B and subsequent processes are identical to those shown in FIG. 1. Therefore, in FIG. 5, those processes are omitted.

Figure 6:
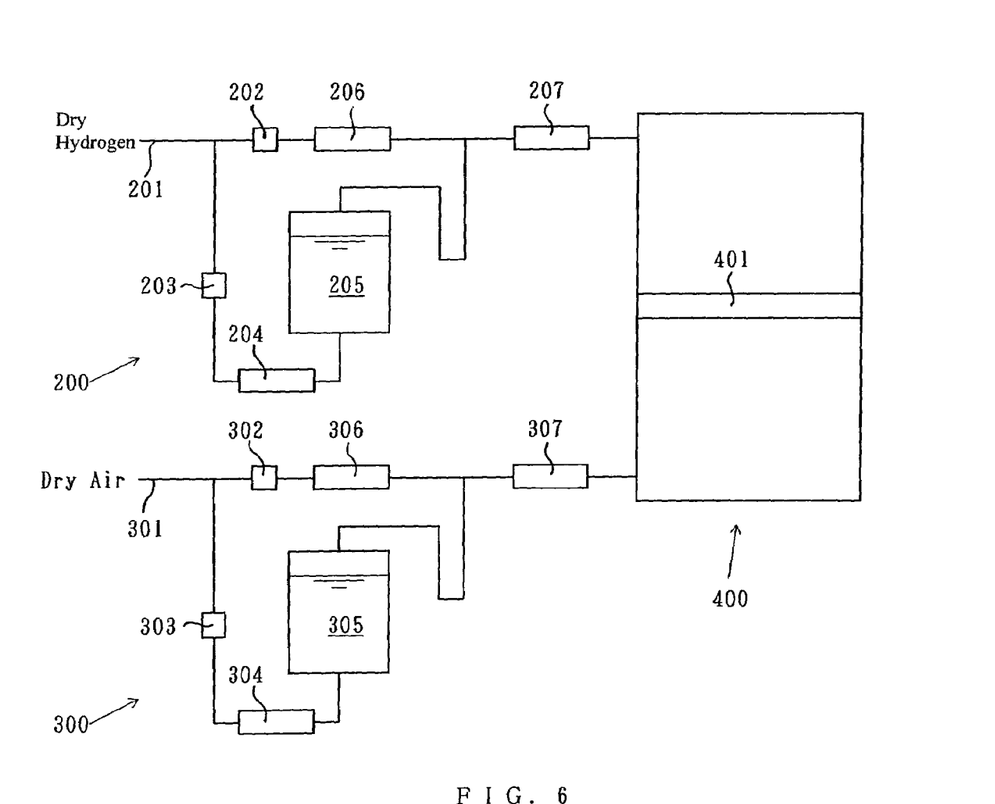
FIG. 6 is an explanatory drawings illustrating a configuration example of the hydrogen and air supply apparatuses for fuel cell evaluation.

FIG. 6 shows an example of schematic configuration of a hydrogen supply apparatus and an air supply apparatus constituting a device for evaluating a fuel cell, which is an example of devices that can most effectively use the clean pipe heater which is the pipe heater manufactured by the manufacturing method illustrated by FIG. 1 or FIG. 5.

The hydrogen supply apparatus 200 and air supply apparatus 300 are used to supply humid hydrogen and air as oxygen with the object of evaluating performance characteristics of a fuel cell 400 equipped with an electrolytic membrane 401. Those apparatuses are respectively composed of dry hydrogen and dry air supply systems 201 and 301, mass flow rate control units 202, 203 and 302, 303, preheaters 204 and 304, saturation tanks 205 and 305, preheaters 206 and 306 using the clean pipe heater employing the present invention, and final heaters 207 and 307 for obtaining hydrogen and air with adjusted temperature and humidity which are supplied to the fuel cell 400. The pipe heater and piping are connected with an appropriate mechanism, for example, a taper lock. Connection of electric cable to the pipe heater is implemented with appropriate means such as high-temperature brazing or silicone mold.

For normal generation of power, a fuel cell requires the electrolytic membrane 401 to be in a moist state. For this purpose, the evaluation device measures the relationship between the power generation performance and the moisture of the supplied hydrogen and air by accurately and rapidly changing the humidity. Because the process is identically realized in the hydrogen and air supply apparatuses 200 and 300, the explanation below will be conducted with respect to the hydrogen supply apparatus 200. The mass flow rate control units 202, 203 are adjusted, and gases at a flow rate corresponding to the target humidity, for example, a relative humidity of 50%, flow from branched lines obtained by branching off the main line to the saturation tank 205. The hydrogen is preheated with the preheater 204 and then hydrogen is obtained that contains, for example, saturated steam at 80° C. At the same time, in the dry hydrogen system of the main line, the dry hydrogen is preheated to a temperature close to 80° C. with the preheater 206, a mixed gas composed of this dry hydrogen and the hydrogen containing saturated steam is accurately controlled to a temperature of 80° C. with the final heater 207, and the hydrogen with a relative humidity of 50% at 80° C. is supplied to the fuel cell 400. The power generation efficiency at this time is measured with a measurement instrument (not shown in the figure) constituting the evaluation device. A humidity causing rapid degradation of power generation efficiency and power generation performance is found by varying the humidity of hydrogen finally supplied to the fuel cell by varying the flow rate ratio of the main line and branched line, and the value obtained represents the characteristic of the fuel cell.

Therefore, in such a device, a heater for control is required which is capable of accurately controlling the heating temperature correspondingly to changes in the heating conditions, and the pipe heater with good heating response in accordance with the present invention can be advantageously used for this purpose.

On the other hand, the electrolytic membrane degrades upon absorbing carbon monoxide or sulfur oxides, thereby impeding power generation. For this reason, in the evaluation device, a microquantity of CO is added to the hydrogen and the quantity of CO causing significant changes in the performance of the electrolytic membrane is measured. In this case, if oxides representing rust appear inside the pipes of the preheater 206 and final heater 207 composed of the pipe heaters and those oxides are taken into the fuel cell, the results of evaluating the effect of CO on the electrolytic membrane may be incorrect. For this reason, a very clean pipe heater with no oxides adhered to the inside of the pipe is required as a heater for the fuel cell evaluation device and, therefore, the pipe heater employing the present invention can be used very effectively.

The case where the pipe heater was used for the fuel cell evaluation device was explained hereinabove, but the pipe heater in accordance with the present invention can be widely used in a variety of fields as a heater providing for both the good heating response and the high cleanliness, for example, for temperature control of the gas supplied during fabrication of semiconductors, for temperature control of liquid photoresists for the manufacture of liquid-crystal panels, and for various chemical machines and apparatuses.

Figure 7:
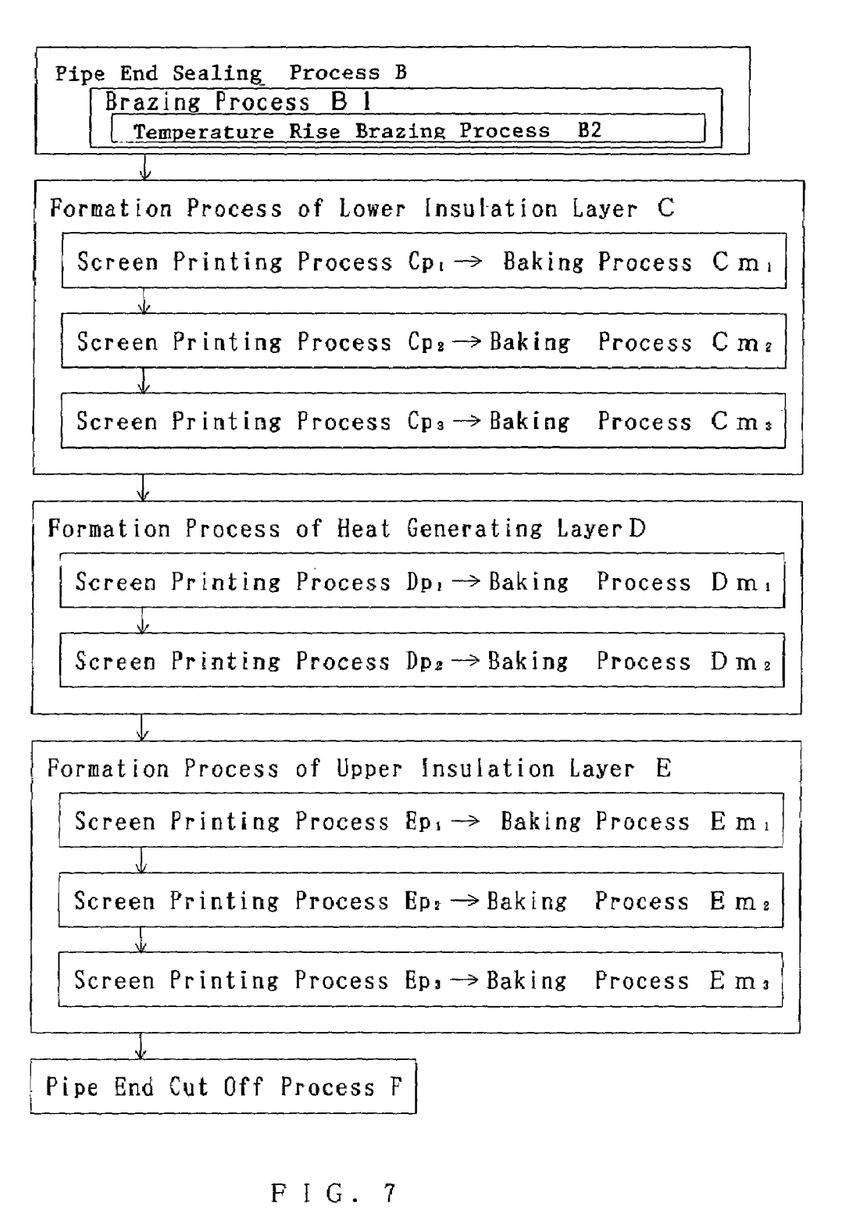
FIG. 7 is an explanatory drawing illustrating part according to yet another example of the pipe heater manufacturing method employing the present invention.

FIG. 7 shows yet another example of the pipe heater manufacturing method employing the present invention.

The method of the present example is identical to the method in which the vacuum making process A is omitted (shown in FIG. 1). In this case, in the pipe end sealing process B, both end portions of the pipe 1 are sealed so that the air under atmospheric pressure, as a gas sealed inside the pipe, does not leak to the outside when the temperature rises to about 850° C. during baking, this gas expands, and pressure thereof increases. For this purpose, as shown in FIG. 1 and in the present example, the pipe end sealing process B is implemented as a brazing process B1, and the plugs 3 shown in FIG. 4 and sealing the pipe ends are strongly joined by brazing to the inner surface of the pipe. This brazing is conducted in an appropriate work site inside or outside the furnace under atmospheric pressure.

As a result, the pipe 1 is sealed with the air under atmospheric pressure introduced in the pipe. Therefore, in the present example, the temperature rise-fall cycles between the normal temperature and 850° C. are repeated a total of 8 times during baking and each time the pressure inside the pipe inner space 12 fluctuates between the atmospheric pressure and a pressure which is three times as high as the atmospheric pressure. However, because both end portions of the pipe are tightly sealed by brazing, the air-tight state inside the pipe is maintained and penetration of the air from the outside can be prevented. As a result, only a very small amount of air that was initially sealed is present inside the pipe and no air is continuously supplied thereafter into the pipe. Therefore, a clean state practically without oxidation can be obtained inside the pipe.

Apart from the cases where extremely high cleanliness is required, as in applications for fuel cell evaluation devices, the pipe heater manufactured by the manufacturing method of the present example can be effectively used as a heater for employment in the processes for the manufacture of semiconductors or liquid crystals.

The pipe heater in accordance with the present invention can be especially advantageously used as a clean pipe heater for the fuel cell evaluation devices. In addition it can be widely used as a clean pipe heater for the processes for the manufacture of semiconductors or liquid crystals and also as a clean pipe heater constituting various chemical machines and apparatuses.

What is claimed is:

1. A method for manufacturing a pipe heater in a furnace, said pipe heater having a stainless steel pipe, said steel pipe having an outer side, an inside and opposing end portions, said pipe heater further having an electric resistor on said outer side of said stainless steel pipe, wherein said heater is adapted for heating fluid flowing through said inside of said pipe, said method comprising the steps of:
    forming a vacuum within said pipe by positioning said pipe into said furnace and evacuating said furnace;
    sealing both end portions of said pipe for interrupting flow through said vacuumed pipe;
    forming a lower insulating layer on said outer side of said pipe by baking an insulating glass material thereto;
    forming a heat generating layer on said lower insulating layer by baking said electric resistor on top thereof;
    forming an upper insulating layer on said heat generating layer by baking an insulating glass material on top thereof; and
    cutting off said two end portions of said pipe.

2. The method of claim 1, wherein said step of forming a vacuum within said pipe further comprises providing an inert gas atmosphere within said furnace and within said pipe.

3. The method of claim 1, wherein said step of sealing said end portions of said pipe further comprises the steps of:
    positioning sealing members against said opposing pipe ends, said sealing members having shaft portions, said shaft portions being positioned within said pipe ends; and
    brazing said sealing members.

4. The method of claim 3, wherein said brazing step comprises:
    providing recesses in a circumferential direction in said shaft portions of said sealing members, providing a braze into said recesses, raising said furnace temperature after inserting said shaft portions into both said pipe end portions, melting said braze, and joining said inner sides of both said end portions of said pipe to respective said shaft portions.

5. A method of manufacturing a pipe heater, said pipe heater having a stainless steel pipe, said steel pipe having opposing ends, an outer side and an inside, said heater having an electric resistor on said outer side of said pipe, wherein said heater is adapted for heating fluid flowing through said inside of said pipe, said method comprising the steps of:
    sealing both said end portions of said pipe for interrupting flow through said pipe;
    forming a lower insulating layer on said outer side of said pipe by baking an insulating glass material thereto;
    forming a heat generating layer on said lower insulating layer by baking said electric resistor on top thereof;
    forming an upper insulating layer on said heat generating layer by baking an insulating glass material on top thereof; and
    cutting off said two end portions of said pipe, wherein:
    said step of sealing said pipe comprises providing a leakproof seal on both of said end portions of said pipe so that pressure within said pipe increases when gas expands during baking.

* * * * *